(12) United States Patent
Lo

(10) Patent No.: US 9,739,930 B2
(45) Date of Patent: Aug. 22, 2017

(54) BACKLIGHT MODULE HAVING A FRAME ELEMENT, LIGHT BAR, LIGHT GUIDING PLATE AND LIGHT BAR COVER

(71) Applicant: InnoLux Corporation, Miao-Li County (TW)

(72) Inventor: Ching-I Lo, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 121 days.

(21) Appl. No.: 14/632,377

(22) Filed: Feb. 26, 2015

(65) Prior Publication Data

US 2015/0241624 A1 Aug. 27, 2015

(30) Foreign Application Priority Data

Feb. 27, 2014 (TW) .............................. 103106747 A

(51) Int. Cl.
*F21V 8/00* (2006.01)
(52) U.S. Cl.
CPC ........... *G02B 6/0088* (2013.01); *G02B 6/009* (2013.01)
(58) Field of Classification Search
CPC .... G02B 6/0088; G02B 6/009; G02B 6/0091; G02B 6/0028
See application file for complete search history.

(56) References Cited

U.S. PATENT DOCUMENTS

| | | | |
|---|---|---|---|
| 6,480,245 B1 | 11/2002 | Sakamoto et al. | |
| 7,153,018 B2 * | 12/2006 | Nomura | G02B 6/0055 349/58 |
| 8,681,292 B2 * | 3/2014 | Kim | G02B 6/0073 349/64 |
| 2007/0212007 A1 * | 9/2007 | Chou | G02B 6/0088 385/120 |
| 2010/0277670 A1 * | 11/2010 | Hamada | G02B 6/0088 349/62 |
| 2012/0287355 A1 * | 11/2012 | Oya | G02B 6/0031 348/790 |

(Continued)

FOREIGN PATENT DOCUMENTS

| | | |
|---|---|---|
| CN | 101307894 A | 11/2008 |
| CN | 101592820 A | 12/2009 |
| CN | 103513450 A | 1/2014 |

(Continued)

*Primary Examiner* — Robert May
(74) *Attorney, Agent, or Firm* — Muncy, Geissler, Olds & Lowe, P.C.

(57) ABSTRACT

A backlight module includes a light guiding plate, a frame element, a light bar and a light-bar cover. The light guiding plate has a light output surface. The frame element includes a bottom surface and a side wall, the bottom surface is parallel to the light output surface of the light guiding plate, and the side wall is extended from the bottom surface and towards a direction perpendicular to the light output surface. The light guiding plate is disposed in the frame element. The light bar is disposed in the frame element and between the side wall and the light guiding plate. The light-bar cover is disposed on the light bar and includes a covering portion substantially parallel to the bottom surface of the frame element. The light bar and the light guiding plate are disposed between the covering portion and the bottom surface of the frame element.

10 Claims, 9 Drawing Sheets

(56) References Cited

U.S. PATENT DOCUMENTS

2014/0132848 A1* 5/2014 Mouri ................... G02B 6/009
  348/801

FOREIGN PATENT DOCUMENTS

| CN | 103529596 A | 1/2014 |
| TW | 200903100 A | 1/2009 |
| WO | WO 2012/105118 A1 | 8/2012 |

* cited by examiner

BACKLIGHT MODULE HAVING A FRAME ELEMENT, LIGHT BAR, LIGHT GUIDING PLATE AND LIGHT BAR COVER

CROSS REFERENCE TO RELATED APPLICATIONS

This Non-provisional application claims priority under 35 U.S.C. §119(a) on Patent Application No(s). 103106747 filed in Taiwan, Republic of China on Feb. 27, 2014, the entire contents of which are hereby incorporated by reference.

BACKGROUND OF THE INVENTION

Field of Invention

The invention relates to a backlight module and, in particular, to a backlight module that can be applied to a flat display device.

Related Art

Flat display devices, having advantages such as low power consumption, less heat, light weight and non-radiation, have been widely applied to various electronic products and gradually take the place of cathode ray tube (CRT) display apparatuses.

Generally, a non-self-luminous flat display device mainly includes a display panel and a backlight module, and the backlight module provides the light for the display panel to achieve the display purpose. However, due to bad mechanical design, the current backlight module has very low efficiency in assembly.

FIG. 1 is a schematic diagram of a conventional backlight module 1. As shown in FIG. 1, the backlight module 1 includes a back frame 11, a light bar 12 and a light guiding plate 13. The light bar 12 is disposed on a side of the back frame 11 and the light guiding plate 13 is disposed adjacent to the light bar 12, so that the light emitted by the light bar 12 can enter the light guiding plate 13 and then is outputted along a light output direction 14. The back frame 11 not only can be used to hold the light bar 12, light guiding plate or other elements but also can serve as a protecting cover of the light bar 12 to fix and protect the light bar 12. Therefore, the current back frame mainly has a ⊓-like shape. However, for this kind of mechanical design, the light bar 12 and the light guiding plate 13 can't be assembled to the back frame 11 in a vertical direction (i.e. along the light output direction 14) but in an inclined direction. Hence, the assembly difficulty and time will be both increased and the elements will be easily damaged due to the human error in the assembly.

Therefore, it is an important subject to provide a backlight module with an innovative mechanical design so that the elements of the backlight module, such as the light bar and the light guiding plate, can be assembled in a vertical direction and the assembly efficiency can be thus enhanced.

SUMMARY OF THE INVENTION

In view of the foregoing subject, an objective of the invention is to provide a backlight module with an innovative mechanical design so that the elements of the backlight module, such as the light bar and the light guiding plate, can be assembled in a vertical direction and the assembly efficiency can be thus enhanced.

To achieve the above objective, a backlight module according to the invention comprises a light guiding plate, a frame element, a light bar and a light-bar cover. The light guiding plate has a light output surface. The frame element includes a bottom surface and a side wall. The bottom surface is parallel to the light output surface of the light guiding plate. The side wall is extended from the bottom surface and towards a direction perpendicular to the light output surface. The light guiding plate is disposed in the frame element. The light bar is disposed in the frame element and between the side wall and the light guiding plate. The light-bar cover is disposed on the light bar and includes a covering portion substantially parallel to the bottom surface of the frame element. The light bar and the light guiding plate are disposed between the covering portion and the bottom surface of the frame element.

In one embodiment, a cross-section of the frame element has an L-like shape, and the cross-section is about the side wall and the bottom surface.

In one embodiment, the light-bar cover further includes an extending wall, the extending wall is extended from the covering portion and towards the direction perpendicular to the light output surface, and thus a cross-section of the light-bar cover has an L-like shape.

In one embodiment, the backlight module further comprises an adhesive element, which is disposed on the covering portion of the light-bar cover to adhere to the light-bar cover, the light bar and the light guiding plate.

In one embodiment, the extending wall of the light-bar cover is disposed on the side wall of the frame element.

In one embodiment, the light-bar cover is connected to the frame element by adhering, locking, engaging or hot melting.

In one embodiment, the backlight module further comprises a support plate disposed between the light bar and the light-bar cover.

In one embodiment, the covering portion of the light-bar cover includes a recess and the light bar is disposed in the recess.

In one embodiment, the light-bar cover further includes an extending wall and a connection portion, and the connection portion is extended from the covering portion and connected to the extending wall.

In one embodiment, the light-bar cover further includes an engaging portion, which is engaged with the side wall of the frame element.

As mentioned above, in the backlight module of the invention, the light-bar cover is disposed on the light bar and includes a covering portion substantially parallel to the bottom surface of the frame element. The light bar and the light guiding plate are disposed between the covering portion and the bottom surface of the frame element. By adding the light-bar cover, the conventional frame element can be changed in shape. For example, the portion of the frame element near the light bar is changed into an L-like shape so that the light bar, the light-bar cover and the light guiding plate can be assembled along a vertical direction, thereby enhancing assembly efficiency and reducing the assembly time.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
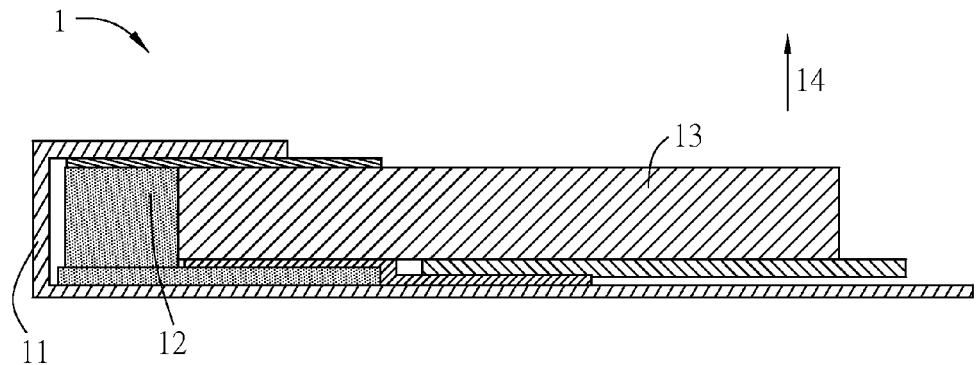
FIG. 1 is a schematic diagram of a conventional backlight module.
Figure 2:
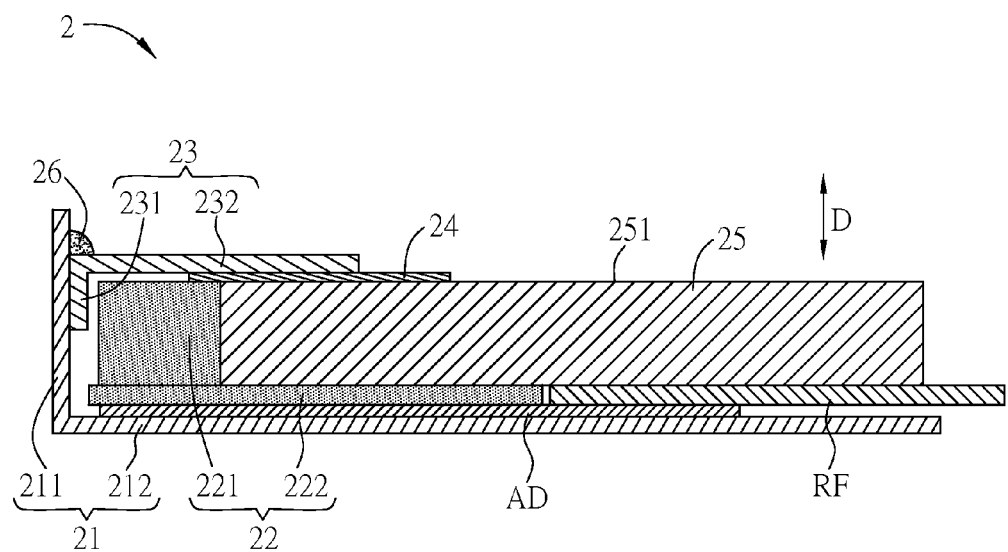
FIG. 2 is a schematic diagram of a backlight module of an embodiment of the invention.

FIG. 2 is a schematic diagram of a backlight module 2 of an embodiment of the invention. As shown in FIG. 2, the backlight module 2 includes a frame element 21, a light bar 22, a light-bar cover 23 and a light guiding plate 25. The backlight module 2 of this embodiment can be applied to any light emitting device, such as an illumination device or display device, and especially to a flat display device. However, this invention is not limited thereto.

The material of the frame element 21 includes plastic material, metal or their combination for example. The shape of the frame element 21 can be adjusted according to the actual requirement. The favorable case is that the part of the frame element 21 near the light bar 22 has an L-like shape, as shown in FIG. 2. Thereby, the light bar 22, the light-bar cover 23 and other elements can be assembled to the frame element 21 in a vertical direction D. In this embodiment, the part of the frame element 21 near the light bar 22 includes a side wall 211 and a bottom surface 212. The side wall 211 and the bottom surface 212 connect each other and a cross-section thereof has an L-like shape. The bottom surface is parallel to a light output surface 251 of the light guiding plate 25. The side wall 211 is extended from the bottom surface 212 and towards a direction perpendicular to the light output surface 251. The light guiding plate 25 is disposed in the frame element 21.

Herein, the side wall 211 is parallel to the vertical direction D, and the bottom surface 212 is disposed perpendicular to the side wall 211. In the application of the flat display device, the frame element 21 is a back plate for example. To be noted, the part of the frame element 21 near the light bar 22 doesn't cover the light bar 22, or the side wall 211 is not extended to the top of the light bar 22, or the side of the frame element 21 opposite to the bottom surface 212 has an opening that is disposed at least corresponding to the light bar 22. By anyone of the above-mentioned mechanical designs, the light bar 22 can be assembled in a vertical direction.

The light bar 22 is disposed in the frame element 21 and, for example, at an edge of the frame element 21. The light bar 22 is disposed between the side wall 211 and the light guiding plate 25. The light bar 22 includes a plurality of light emitting elements disposed on a carrier board for example. The light emitting element is a light emitting diode (LED) and the carrier board is an inflexible circuit board or a flexible printed circuit board (FPCB), for example. The LED is a top emission, side emission or bottom emission type for example. The disposition of the light emitting element is not particularly limited in this invention, as long as the light emitted by the light emitting element can enter the light guiding plate 25 disposed on a side of the light bar 22 and is evenly outputted from the light output surface 251 of the light guiding plate 25 to provide the required brightness for the display device. Generally, the light output surface 251 is perpendicular to the vertical direction D. In this embodiment, the light bar 22 includes a plurality of light emitting elements 211 and a carrier board 222, and the light emitting elements 221 are disposed on the carrier board 222. The light emitting elements 221 are disposed among the light guiding plate 25, the light-bar cover 23 and the frame element 21. The carrier board 222 is extended from the bottom of the light emitting element 221 to a bottom side of the light guiding plate 25.

Figure 7A:
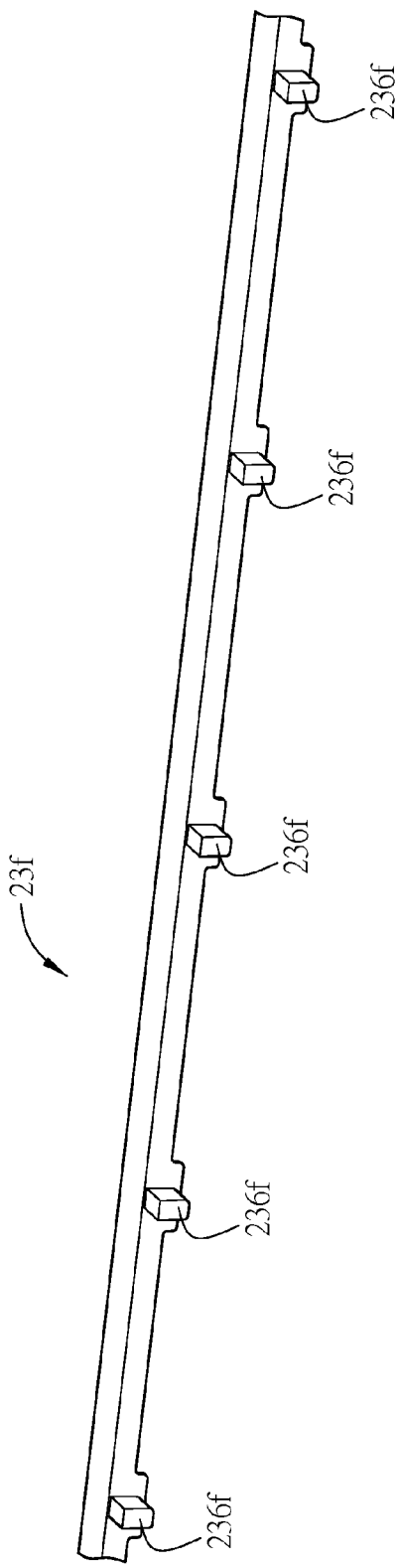
FIGS. 7A, 7B, 8A, and 8B are schematic diagrams of the variations of the light-bar cover of an embodiment of the invention.
Figure 7B:
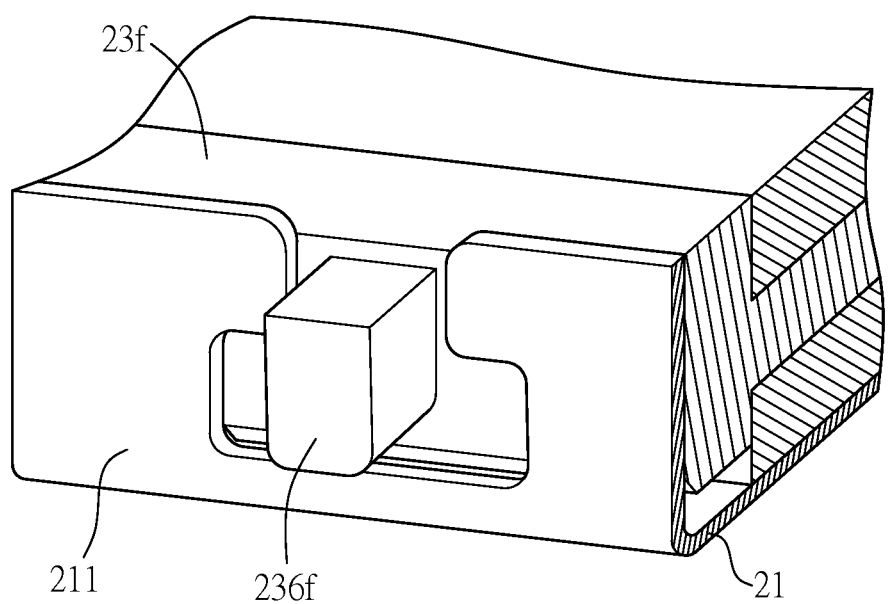
Figure 8A:
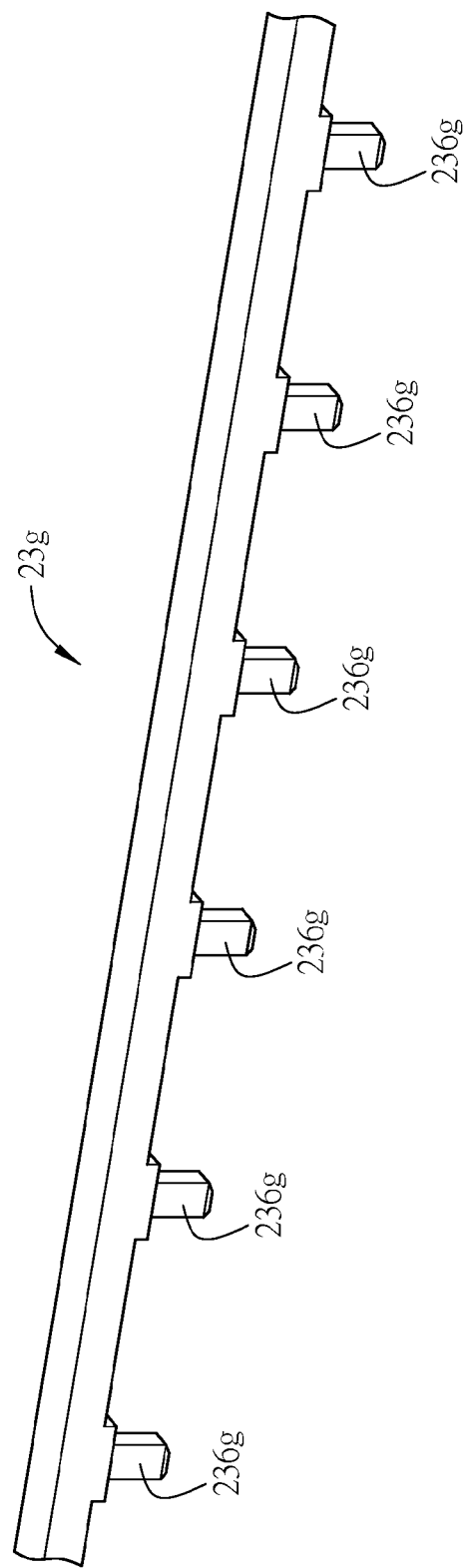
Figure 8B:
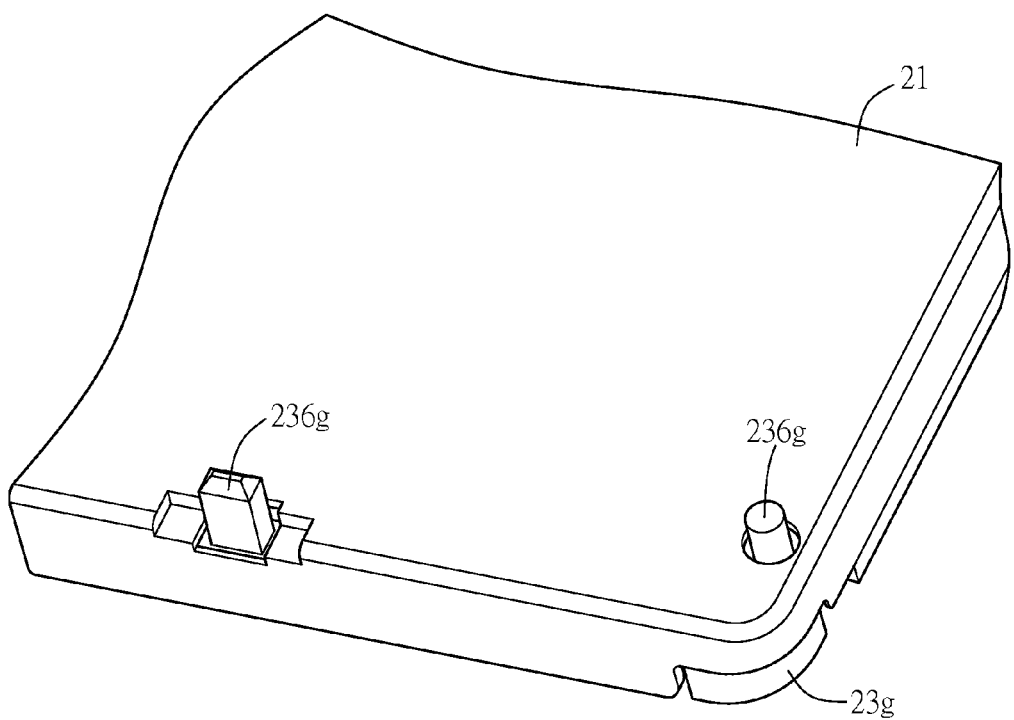

The light-bar cover 23 is disposed on the light bar 22 and covers the light bar 22. The light-bar cover 23 is disposed over the light bar 22 and can protect and fix the light bar 22. The light-bar cover 23 is connected to the frame element 21 by adhering, locking, engaging, hot melting or their any combination for example. Herein, the light-bar cover 23 is connected to the frame element 21 at least by an adhesive 26. In other embodiments, the light-bar cover 23 can include at least one hot melting portion to be connected to the frame element 21 by hot melting. As shown in FIGS. 7A and 7B, the light-bar cover 23f includes a plurality of hot melting portions 236f, which are protruded from a side of the light-bar cover 23f to the side wall 211 of the frame element 21 and can be disposed at the opening of the frame element 21 for the hot melting. Moreover, as shown in FIGS. 8A and 8B, the light-bar cover 23g includes a plurality of hot melting portions 236g, which are protruded downward along the vertical direction D (as shown in FIG. 2) from a side of the light-bar cover 23g. Besides, the hot melting portions 236g can be disposed at the opening of the frame element 21 for the hot melting.

The light-bar cover 23 includes a covering portion 232, which is approximately parallel to the bottom surface 212 of the frame element 21. In this embodiment, the light-bar cover 23 further includes an extending wall 231. The extending wall 231 is extended from the covering portion 232 and towards the direction perpendicular to the light output surface 251, so that a cross-section of the light-bar cover 23 has an L-like shape. Moreover, the light bar 22 and the light guiding plate 25 are disposed between the covering portion 232 and the bottom surface 212 of the frame element 21.

In this embodiment, the extending wall 231 is disposed on the side wall 211 of the frame element 21 and connected to the frame element 21. The extending wall 231 can be disposed on the inner side or outer side of the frame element 21, and FIG. 2 shows the extending wall 231 is disposed on the inner side of the frame element 21 for example. The covering portion 232 is disposed opposite to the bottom surface 212 of the frame element 21. The covering portion 232 is extended from the top of the light bar 22 to the top of the light guiding plate 25. The material of the light-bar cover 23 can include plastic material, metal or their combination. The light-bar cover 23 is formed by injection molding or insert molding for example.

The backlight module 2 can further include an adhesive element 24, which is disposed on the covering portion 232 of the light-bar cover 23 to adhere to the light-bar cover 23, the light bar 22 and the light guiding plate 25. Herein, the adhesive element 24 adheres to not only the light bar 22 and the light-bar cover 23 but also the light guiding plate 25 and the light-bar cover 23. In other embodiments, the adhesive element 24 is a so-called white tape for example, and in this case, the adhesive element 24 is a reflective element to reflect the light back to the light-guiding plate 25 for enhancing the light utilization rate. Besides, the adhesive element 24 is only connected to the light-bar cover 23 but not connected to the light guiding plate 25 or the light bar 22.

In this embodiment, the backlight module 2 can further include other elements as illustrated as below for example. The backlight module 2 can further include a reflective film RF, which is disposed under the light guiding plate 25 to reflect the light into the light guiding plate 25 for enhancing the light utilization rate. Moreover, the backlight module 2 can further include an adhesive device AD, which adheres to the reflective film RF and the frame element 21. In this embodiment, the adhesive device AD is a twin adhesive for example and further adheres to between the light bar 22 and the frame element 21.

Figure 3A:
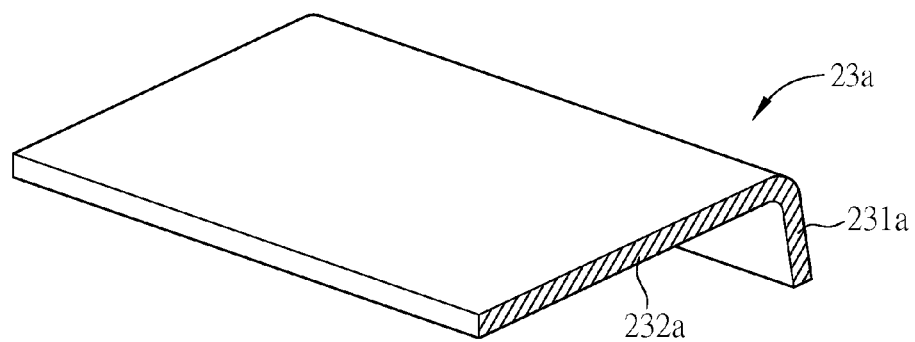
FIGS. 3A to 3D are schematic diagrams of the variations of the light-bar cover of an embodiment of the invention.
Figure 3B:
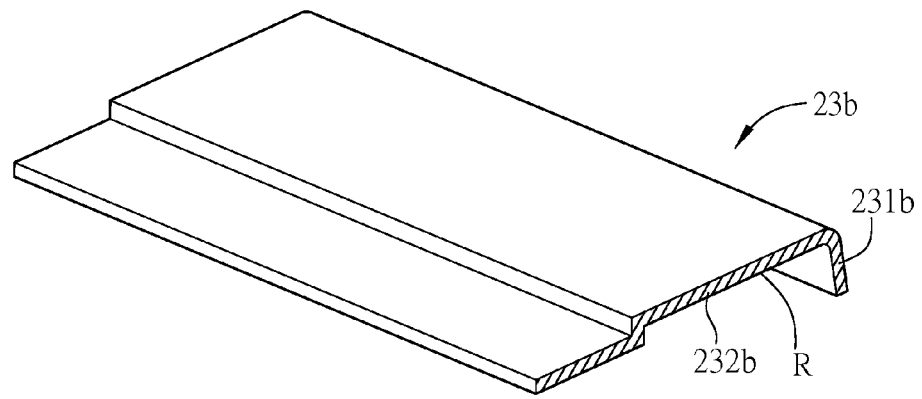
Figure 3C:
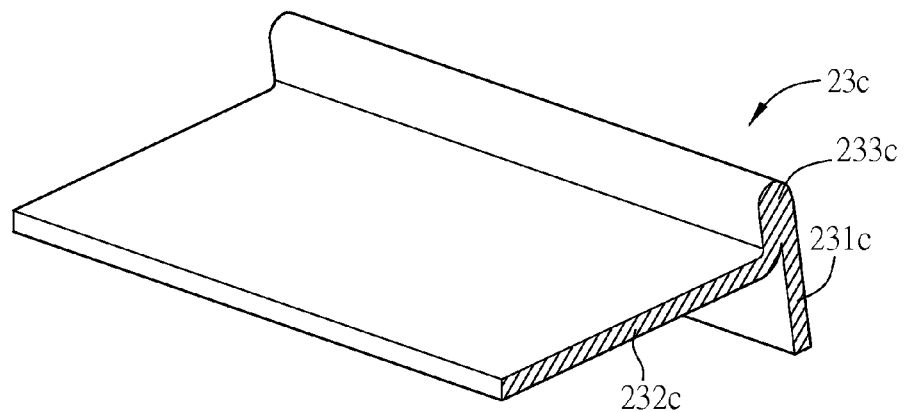
Figure 3D:
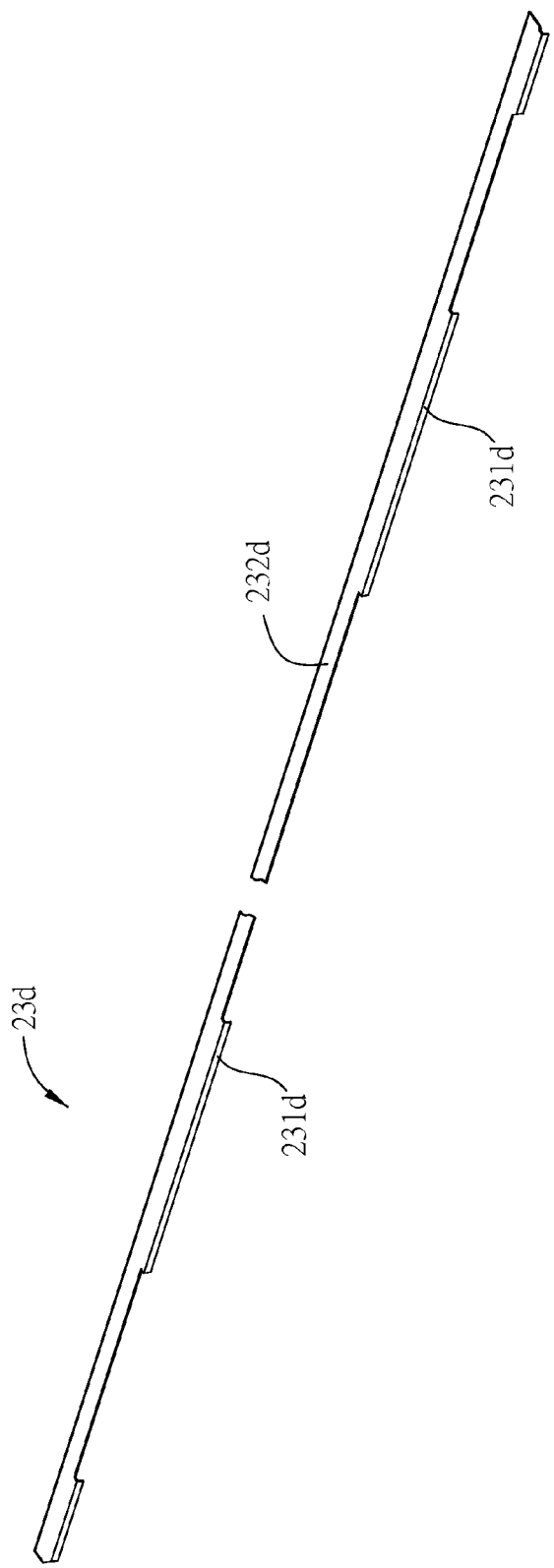

FIGS. 3A to 3D are schematic diagrams of the variations of the light-bar cover 23. As shown in FIG. 3A, the light-bar cover 23a includes an extending wall 231a and a covering portion 232a, and the extending wall 231a and the covering portion 232a are perpendicular to each other and connected to each other. As shown in FIG. 3B, the light-bar cover 23b includes an extending wall 231b and a covering portion 232b, and the extending wall 231b and the covering portion 232b are perpendicular to each other and connected to each other. Besides, the covering portion 232b has a stepped shape and forms a recess R. Thereby, the structural strength of the light-bar cover 23b can be enhanced and the light bar 22 can be disposed in the recess R. As shown in FIG. 3C, the light-bar cover 23c includes an extending wall 231c, a covering portion 232c and a connection portion 233c, and the connection portion 233c is extended from the covering portion 232c and connected to the extending wall 231c. By the disposition of the connection portion 233c, the contact area between the light-bar cover 23 and the frame element 21 can be increased and the whole connection strength can be thus enhanced. As shown in FIG. 3D, the light-bar cover 23d is similar to the light-bar covers 23a-23c, and the difference between them is that the extending wall 231d of the light-bar cover 23d is not a continuous wall but with a plurality of openings for more flexibly adapting to the structure design of the frame element 21.

Figure 4:
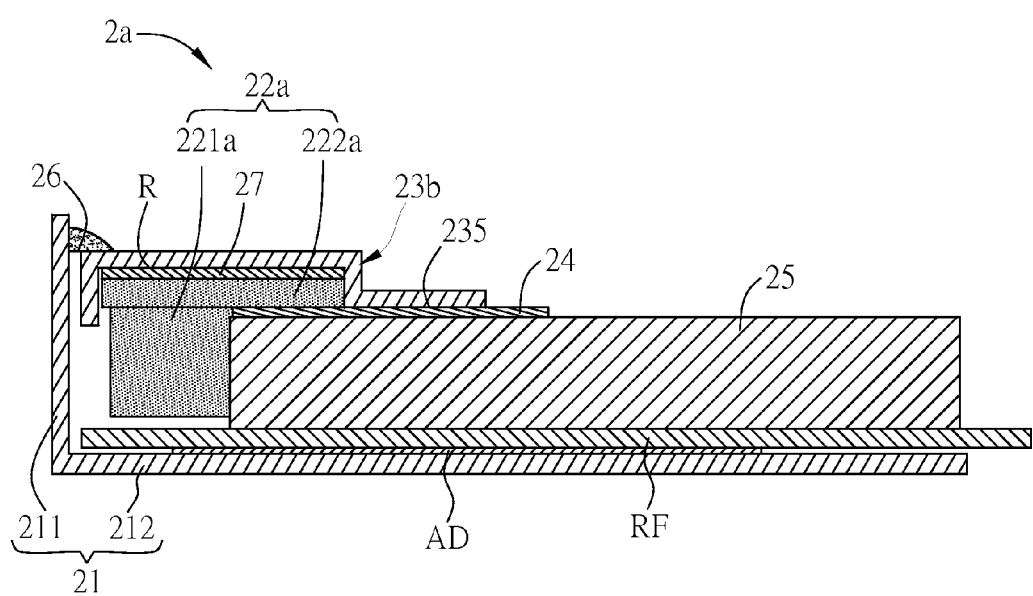
FIG. 4 is a schematic diagram of a backlight module according to another embodiment of the invention.

FIG. 4 is a schematic diagram of a backlight module 2a according to another embodiment of the invention. The backlight module 2a includes a frame element 21, a light bar 22a, a light-bar cover 23b, an adhesive element 24 and a light guiding plate 25. The main difference between the backlight modules 2a and 2 is just illustrated as below, and other technical features of the backlight module 2a can be comprehended by referring to the backlight module 2. The light bar 22a of the backlight module 2a includes a plurality of light emitting element 221a and a carrier board 222a. The carrier board 222a is disposed in the recess R (also referring to FIG. 3B) of the light-bar cover 23b and aligned evenly with a surface 235 of the light-bar cover 23b. Moreover, the backlight module 2a further includes a support plate 27, which is disposed between the light bar 22a and the light-bar cover 23b. In this embodiment, the support plate 27 is disposed in the recess R of the covering portion 232 of the light-bar cover 23b and between the light-bar cover 23b and the carrier board 222a. The support plate 27 adheres to the light-bar cover 23b, for example, by a twin adhesive. The material of the support plate 27 includes polyimide or other kinds of polymer. In this embodiment, the adhesive element 24 adheres to the light guiding plate 25, the light-bar cover 23b and the carrier board 222a of the light bar 22a.

The backlight module can have other variations, and some of them are illustrated as below for example.

Figure 5:
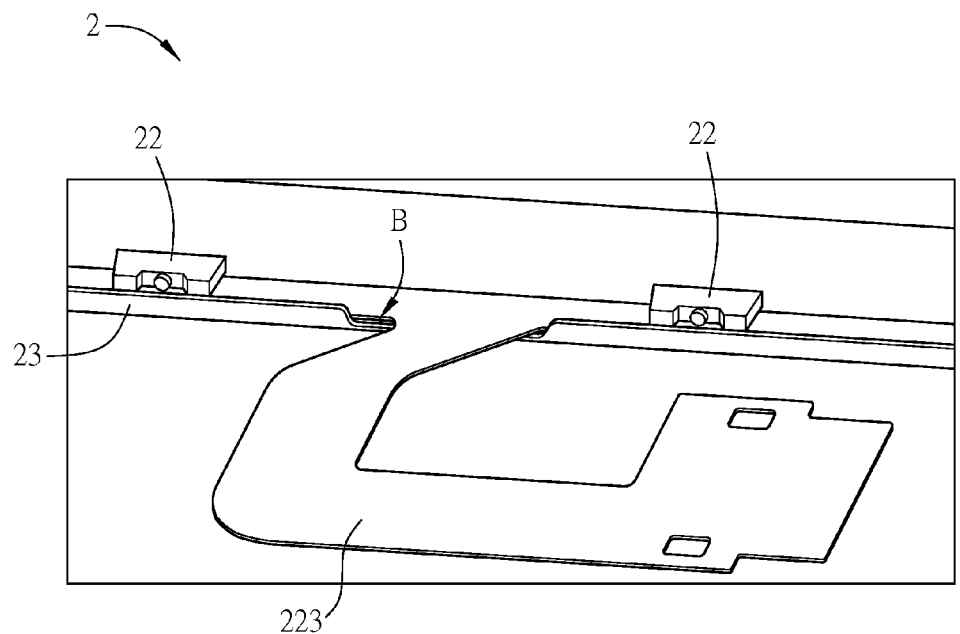
FIG. 5 is a schematic diagram of a backlight module of an embodiment of the invention according to an inverted view angle.

FIG. 5 is a schematic diagram of a backlight module 2 according to an inverted view angle. As shown in FIG. 5, the light-bar cover 23 has a broken hole B at the circuit passage for allowing the passage of the circuit (e.g. wires). Herein, the broken hole B of the light-bar cover 23 can allow the passage of a circuit 223 of the light bar 22, and thereby the vertical assembly can be facilitated.

Figure 6:
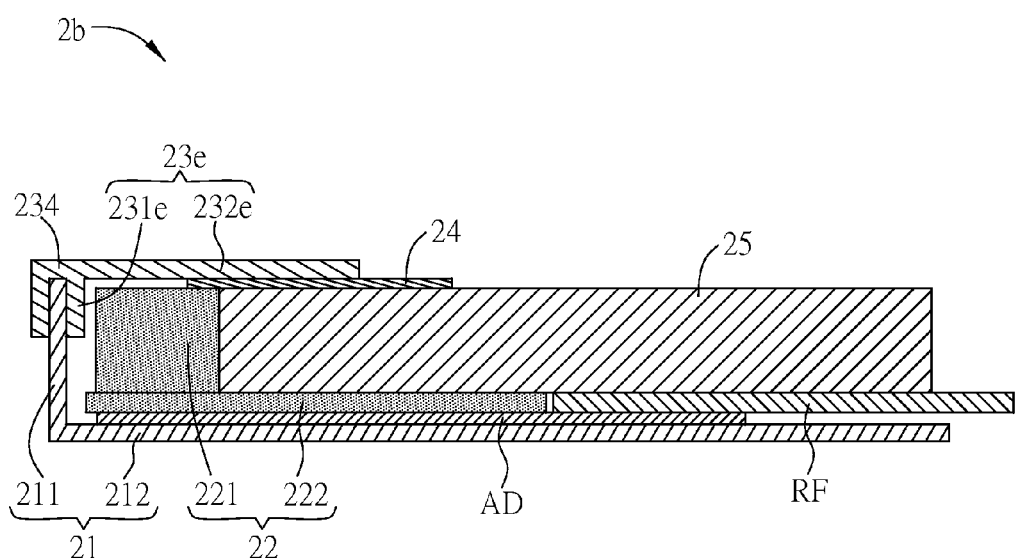
FIG. 6 is a schematic diagram of a backlight module of another embodiment of the invention.

FIG. 6 is a schematic diagram of a backlight module 2b of another embodiment of the invention. As shown in FIG. 6, the light-bar cover 23e of the backlight module 2b includes an engaging portion 234, which is engaged with the side wall 211 of the frame element 21. Herein, the engaging portion 234 has a ⊓-like shape to engage with the frame element 21, and thereby the whole connection strength can be enhanced. Herein, an extending wall 231e of the light-bar cover 23e is disposed on a side of the frame element 21, and the engaging portion 234 is extended from the extending wall 231e of the light-bar cover 23e to the other side of the frame element 21. In other embodiments, the engaging portion 234 can have other shapes and can be extended from other portions of the light-bar cover 23e.

Summarily, in the backlight module of the invention, the light-bar cover is disposed on the light bar and includes a covering portion substantially parallel to the bottom surface of the frame element. The light bar and the light guiding plate are disposed between the covering portion and the bottom surface of the frame element. By adding the light-bar cover, the conventional frame element can be changed in shape. For example, the portion of the frame element near the light bar is changed into an L-like shape so that the light bar, the light-bar cover and the light guiding plate can be assembled along a vertical direction, thereby enhancing assembly efficiency and reducing the assembly time.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:
1. A backlight module, comprising:
a light guiding plate having a light output surface;
a frame element including a bottom surface and a side wall, wherein the bottom surface is parallel to the light output surface of the light guiding plate, the side wall is extended from the bottom surface and towards a direction perpendicular to the light output surface, and the light guiding plate is disposed in the frame element;
a light bar disposed in the frame element and between the side wall and the light guiding plate;
a light-bar cover disposed on the light bar and including a covering portion substantially parallel to the bottom surface of the frame element, wherein the light bar and the light guiding plate are disposed between the covering portion and the bottom surface of the frame element; and
a first adhesive element disposed on the covering portion of the light-bar cover to adhere to the light-bar cover, the light bar and the light guiding plate,
wherein the light-bar cover is connected to the frame element by a second adhesive element, locking or hot melting.

2. The backlight module as recited in claim 1, wherein a cross-section of the frame element has an L-like shape, and the cross-section is about the side wall and the bottom surface.

3. The backlight module as recited in claim 1, wherein the light-bar cover further includes an extending wall, the extending wall is extended from the covering portion and towards the direction perpendicular to the light output surface, and thus a cross-section of the light-bar cover has an L-like shape.

4. The backlight module as recited in claim 3, wherein the extending wall of the light-bar cover is disposed on the side wall of the frame element.

5. The backlight module as recited in claim 1, further comprising:
a support plate disposed between the light bar and the light-bar cover.

6. The backlight module as recited in claim 5, wherein the covering portion of the light-bar cover includes a recess and the light bar is disposed in the recess.

7. The backlight module as recited in claim 1, wherein the covering portion of the light-bar cover includes a recess and the light bar is disposed in the recess.

8. The backlight module as recited in claim 1, wherein the light-bar cover further includes an extending wall and a connection portion, and the connection portion is extended from the covering portion and connected to the extending wall.

9. The backlight module as recited in claim 1, wherein the light-bar cover further includes an engaging portion, which is engaged with the side wall of the frame element.

10. The backlight module as recited in claim 1, wherein the first adhesive element is a tape.

\* \* \* \* \*